(12) United States Patent
Altay et al.

(10) Patent No.: US 10,798,638 B2
(45) Date of Patent: Oct. 6, 2020

(54) APPARATUS AND METHOD FOR CONTROLLER AND SLICE-BASED SECURITY GATEWAY FOR 5G

(71) Applicant: NETSIA, INC., Sunnyvale, CA (US)

(72) Inventors: Can Altay, Istanbul (TR); Beytullah Yigit, Istanbul (TR); Seyhan Civanlar, Istanbul (TR)

(73) Assignee: NETSIA, INC., Santa Clara, CA (US)

( * ) Notice: Subject to any disclaimer, the term of this patent is extended or adjusted under 35 U.S.C. 154(b) by 68 days.

(21) Appl. No.: 16/278,027

(22) Filed: Feb. 15, 2019

(65) Prior Publication Data
US 2020/0267623 A1 Aug. 20, 2020

(51) Int. Cl.
| | | |
|---|---|---|
| *H04W 40/34* | (2009.01) |
| *H04W 88/16* | (2009.01) |
| *H04W 76/12* | (2018.01) |
| *H04L 12/46* | (2006.01) |
| *H04W 12/00* | (2009.01) |
| *H04W 28/02* | (2009.01) |
| *H04W 40/24* | (2009.01) |
| *H04W 12/10* | (2009.01) |
| *H04W 80/06* | (2009.01) |
| *H04W 80/08* | (2009.01) |
| *H04L 12/715* | (2013.01) |
| *H04L 12/709* | (2013.01) |
| *H04L 12/723* | (2013.01) |

(52) U.S. Cl.
CPC ......... *H04W 40/34* (2013.01); *H04L 12/4633* (2013.01); *H04L 12/4641* (2013.01); *H04L 45/245* (2013.01); *H04L 45/50* (2013.01); *H04L 45/64* (2013.01); *H04W 12/0013* (2019.01); *H04W 12/1002* (2019.01); *H04W 28/0268* (2013.01); *H04W 40/248* (2013.01); *H04W 76/12* (2018.02); *H04W 88/16* (2013.01); *H04W 80/06* (2013.01); *H04W 80/08* (2013.01)

(58) Field of Classification Search
None
See application file for complete search history.

(56) References Cited

U.S. PATENT DOCUMENTS

| | | | | |
|---|---|---|---|---|
| 2014/0029451 A1* | 1/2014 | Nguyen | ................ | H04L 43/12 370/252 |
| 2014/0241247 A1* | 8/2014 | Kempf | ................ | H04L 12/4641 370/328 |
| 2016/0157274 A1* | 6/2016 | Akiyoshi | ............ | H04W 76/12 370/254 |
| 2020/0145876 A1* | 5/2020 | Dao | ................ | H04W 28/06 |

* cited by examiner

*Primary Examiner* — Diane L Lo
(74) *Attorney, Agent, or Firm* — IP Authority, LLC; Ramraj Soundararajan

(57) ABSTRACT

Disclosed within are a system and method for efficient slicing of an SDN-based 5G core network by using service-specific aggregate tunnels along key tunnel interfaces between network functions.

21 Claims, 11 Drawing Sheets

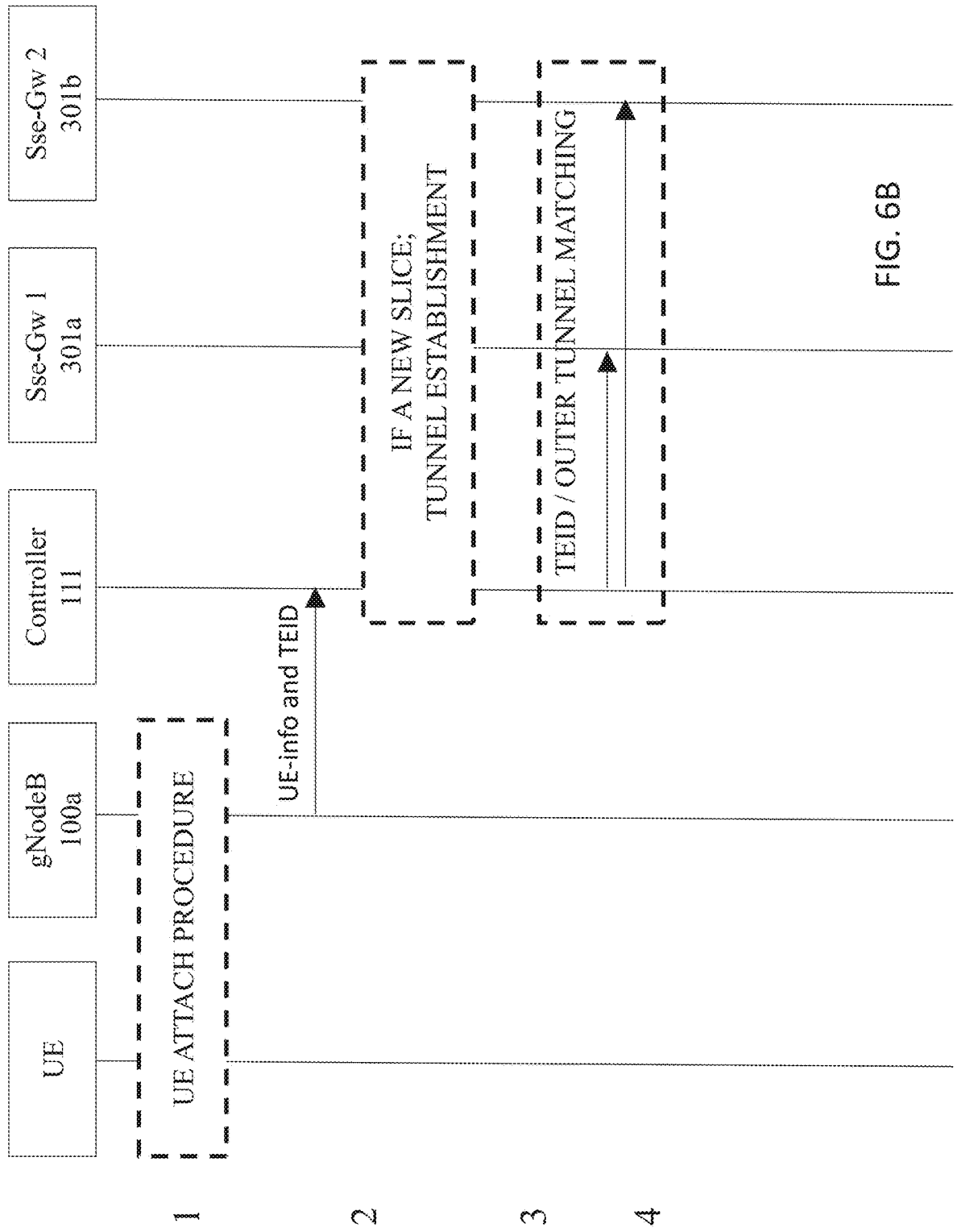

APPARATUS AND METHOD FOR CONTROLLER AND SLICE-BASED SECURITY GATEWAY FOR 5G

BACKGROUND OF THE INVENTION

Field of Invention

The present invention relates to a system and method for efficient slicing of an SDN-based 5G core network by using service-specific aggregate tunnels along key tunnel interfaces between network functions.

Discussion of Related Art

Any discussion of the prior art throughout the specification should in no way be considered as an admission that such prior art is widely known or forms part of common general knowledge in the field.

The GPRS Tunneling Protocol (GTP) is a protocol defined by 3GPP to carry packetized radio service within GPRS, 3G, LTE and 5G core networks. One GTP tunnel is established per user equipment, per bearer per QoS (UE/bearer/QoS) and per traffic direction along an interface between any pair of 5G network functions. For example, in an LTE network, two GTP tunnels (one for uplink and one for downlink) are established between base station (eNodeB) and Serving Gateway (S-GW) on S1-U interface, or between S-GW and Packet Data Network Gateway (P-GW) on S5 interface. The eNodeB receives IP packets from the user equipment that is attached to the radio network and destined to a data network (such as the Internet), wraps them into the GTP tunnel payload, which has a source IP address of that eNodeB, and destination IP address of the S-GW. In turn, the S-GW receiving tunneled packets unwraps the GTP header, wraps them into another GTP header, which has the source IP address of that S-GW and destination IP address of the P-GW. When the P-GW receives these packets, it unwraps the GTP header and forwards the payload to the external host. The user plane aspects of S-GW and P-GW functions of LTE are mapped into the User Plane Function (UPF) in 5G core network architecture, but exactly the same GTP-U tunneling method applies between the 5G base station (known as gNodeB) and UPF, and between all other core network functions that carry user control or data messages.

GTP comprises the following protocols: GTP-C, which performs signaling across the core network to activate and deactivate GTP tunnels, and GTP-U, which transports user data between core network functions, and between the Radio Access Network (RAN) and the core network functions. GTP-U supports both IPv4 and IPv6 protocols in its payload. GTP-U tunneling protocol stack, header format and messages are all well known in prior art (see ETSI's 3GPP TS 29.281), and therefore not detailed here. Furthermore, the architectural components of both LTE and 5G core networks are detailed in various ETSI documents, and therefore will not be recited here.

GTP-U tunneling is a simple and robust solution to handle the highly mobile user equipment that has a changing location due to mobility. Instead of constantly changing routing tables in routers of the core network for the changing locations of those IP addresses of users, each UE/bearer/QoS data is wrapped in IP packets as PDU, and then wrapped into a GTP-U tunnel whose source and destination IP addresses are those service functions (e.g., base station as one anchor and UPF as the other anchor) at the two end points of the tunnel. This achieves more stable routing tables while the device moves around in the core network. However, if the UE is handed over to another base station, a new GTP-U tunnel must be formed because the anchor of the tunnel changes from the old base station to the new base station. The old tunnel is disconnected, and a new tunnel is formed and reconstructed using aforementioned GTP-C protocol. All these changes due to mobility of UEs contribute to changes in topology of tunnels and resultant forwarding delays in the core network.

It is clear an extremely large number of GTP-U tunnels will be needed for the emerging services in 5G particularly when there are massive machine type communications of millions of Internet of Things (IOT) generating traffic. Such devices are non-mobile, simply using 5G for access communications, and GTP-U tunnels will be needed for each IOT to be conformant to 5G. Furthermore, new 5G services such as ultra-reliable and low-latency communications (uRLLC) such as vehicle-to-vehicle communications requiring minimum packet delay will be an essential part of 5G.

Besides increasing the number of GTP-U tunnels, the delay and security of user plane backhaul and fronthaul communications become an important problem for small cells. The high bitrate and coverage requirements of 5G have been achieved by denser deployment of small cells or remote radio heads (RRH). Typically, small cells or RRHs provide low operating expenditures (OPEX) as they consume less energy due to lower transmit power. These small units are deployed anywhere with potential high traffic requirements to satisfy the need. A baseband unit (BBU) is deployed to manage a group of RRHs, each RRH connecting to a BBU forming the so-called fronthaul. However, backhaul traffic of small cells and fronthaul traffic of RRHs of the mobile operator are generally routed through third party networks since the operator doesn't have footprint everywhere, which may not satisfy the delay or security needs of the user plane traffic. Even when these third-party networks are SDN, and can be managed by the controller so that they are sliced for that mobile operator meeting it's delay requirements, they are still open to eavesdropping attacks from third parties. Conventionally, security gateways that construct additional IPSec tunnels from GTP-U tunnels to carry traffic through these untrusted networks are used to solve the security problem. However, IPSec tunnels cause additional encryption/decryption delay, wherein the amount of delay depends on the ciphering method. Hence, a security to delay trade-off exists to secure the user traffic, which is addressed in this invention by grouping users and traffic types into large "slices".

Considerable effort has been spent on the air interface component of 5G to reduce network delays using concepts such as 'slicing'. However, there hasn't been as much attention to reduce delay in the core network. The routing of those millions of tunnels in the core network may mean substantial delays especially when the user equipment numbers have significantly increased. A different approach is needed to minimize delays within the core network. A low latency slice will have significantly diminished value without greatly reduced packet delays within the core network. Therefore, 'Network Slicing' that applies to the 5G core network, just like 'RAN Slicing' that applies to the radio network, will be essential to better control delay, reliability and other network parameter that apply to groups of users to meet their unique requirements.

Standards efforts have gone into defining specific slices and their requirements-based application/service. For example, the user equipment can now specify its desired slice using a new field called S-NSSAI. The standards already defined most commonly usable network slices and the corresponding standardized Slice/Service Types (SST) and their values in ETSI document TS 23.501. These SST values are 1, 2 and 3 corresponding to slice types of enhanced Mobile BroadBand (eMBB), ultra-reliable and low-latency communications (uRLLC) and massive IoT (MIoT), respectively, and reflect the most commonly planned new services. The Network slice instance selection for a UE is normally triggered as part of the initial registration procedure. The Access and Mobility Management Function (AMF) retrieves the slices that are allowed by the user's subscription and interacts with the Network Slice Selection Function (NSSF) to select the appropriate network slice instance on the RAN.

A service provider can offer the Network Slice as a Service (NSaaS) to another service provider in the form of a telecommunications service. NSaaS allows the tenant provider to use the network slice instance just like an end user, or optionally allows the tenant provider to manage the specific network slice instance via a management exposure interface. In turn, the tenant provider may use the slice by further slicing it to offer its own communication services family. A public safety network provider, for example, can be a tenant of a mobile operator's network and request a slice that has high security and high reliability.

Each 5G slice must be stitched from a RAN slice as well as the corresponding core network slice, and must be characterized using a 'feature set' wherein the exemplary features are:

1. Application Type (i.e., voice, video, gaming etc.)
2. Bandwidth
3. End-to-end packet latency
4. Reliability/Availability
5. Quality of Service
6. Security (encryption)
7. Charging Type
8. User Equipment Type
9. Traffic Priority
10. Service Function Chain (SFC) on data path
11. Traffic Policies (such as security or routing policies)

An exemplary slice is a highly secure, highly reliable and high priority, which requires (a) traffic encryption, (b) multiple disjoint parallel traffic routes for improved reliability against facilities failures, and (c) high priority treatment against other traffic. The challenge is to map a user's traffic to one of these slices, or more specifically to map each GTP-U tunnel to a proper network slice and route it accordingly in the network. Another exemplary slice is one that uses the same service function chain formed by a group of virtual network functions. The users of this slice visit the same virtual network functions (VNFs).

5G's core architecture specifies all core network functions (UPF, SMF, AMF, NSSF etc.) in a virtualized form that can run on standard platforms. Using Network Function Virtualization (NFV) and Software Define Networking (SDN) concepts, the 5G core network (called 'core SDN' here) will be implemented in a flexible and easily configurable manner creating service functions on the fly as the network and traffic grow. It is therefore safe to assume that the network service functions of the 5G core network are distributed on an SDN that comprises many switches and controlled by one or more controllers. The aforementioned GTP-U tunnels traverse that SDN. Controller must configure the network switches with flow tables to route the GTP-U tunnels between pairs of anchors. Given the size of flow tables in network switches is small, exposing as few GTP-U tunnels as possible in the core SDN is most desirable. This invention reduces the number of GTP-U tunnels exposed to the core SDN switches by aggregating GTP-U tunnels by wrapping them into so called 'outer tunnels' carrying 'inner GTP-U tunnels' with the same or similar feature sets.

In the first embodiment, the controller slices the core SDN according to network slices by (a) pre-configuring different VLANs between anchor pairs, i.e., network service points, each VLAN having a specific feature set, (b) encapsulating each user's GTP-U tunnel into a VLAN that has an associated tag, (c) routing only VLANs within the SDN, and then (d) extracting the VLAN header first and GTP-U tunnel header next to retrieve and deliver the original packet to its destination.

In the second embodiment, the core SDN is sliced according to network slices by pre-configuring Generic Routing Encapsulation (GRE), outer GTP-U tunnels, or Multiprotocol Label Switching (MPLS) tunnels between network service points (eNodeB, UPF, SMF, etc.).

In the third embodiment, the controller slices the core SDN according to network slices that require high level of security via encryption, in which case the outer tunnel is an IPSec tunnel. The outer tunnels can also be a mix of secure IPSec tunnels of different security levels and other types of unencrypted tunnels such as GTP-U.

In the fourth embodiment, the controller slices the core SDN according to application type (i.e., streaming video or gaming), in which case the outer tunnel carries only one type or category of application(s). Mapping the GTP-U tunnels belonging to the same application type may require a Deep Packet Inspection (DPI) at ingress.

Using these embodiments, routing delay within the network is substantially reduced. The processing delay in the switches is also minimized because there are only a few dozen outer tunnels to route instead of millions of user GTP tunnels. As a positive side effect, this causes the flow table sizes within the SDN switches to drastically reduce —remembering that flow table size is a strict limiting factor in current SDN switches. The only overheads of these embodiments are (a) the extra outer tunnel header and (b) the processing at the ingress and egress points of an outer tunnel to wrap and unwrap each inner tunnel. Some portions of the inner tunnel header fields are removed to achieve further header compression.

An outer tunnel can be configured between any pair of network service functions. The network functions terminating the two ends of an outer tunnel are generally different types. However, in a special case of UPF, there may be different instances of UPF at the two ends of the tunnel. Note that the gNodeB is categorized as a network function. The flow table in each SDN switch only routes the outer tunnel in a manner completely unbeknownst to the inner GTP-U tunnels encapsulated by the outer tunnel. Each inner tunnel is mapped into one or more outer tunnels. Multiple tunnels may be needed for reliable slices or for the multicast service.

The inner GTP tunnel must be identifiable to be properly mapped into the outer tunnel that has an associated 'feature set'. For example, each inner tunnel has attributes such as application type, Tunnel End Point ID (TEID) at its GTP-U header, and QoS that are specified at the IP header that can be used to map it to the appropriate outer tunnel. Attributes of the feature set can be directly extracted from Policy and Charging Function (PCF), 5G network's various Operating and Business Support Systems (OSS/BSS), NSaaS service type field, through Deep Packet Inspection (DPI) and/or manually configured by the operator.

In order to implement the outer tunnels concept, a Slice-based security gateway (SSE-GW), the system of invention, is employed in the core SDN in a back-to-back configuration between any two core network service functions that are named here as 'anchors' (such as gNodeB, UPF, SMF, etc.). One SSE-GW may be employed adjacent to each anchor, or to a plurality of the same type of anchor points to support a group of them. The system of invention also includes the SDN controller, which has additional capabilities to collect data corresponding to inner GTP-U tunnels and to configure the Slice-based security gateways in the network to properly map inner tunnels to outer tunnels. The aforementioned controller can be a group of different controllers managed by a higher level orchestrator, or a single controller which can manage both SDN switches and SSE-GWs. Moreover, SSE-GW can be a physically separate network router or can be a software-based implementation, operates in the same physical machine with gNodeB, UPF, or any other network function.

The core SDN is essentially divided into a plurality of network slices, a network slice being a single or a plurality of outer tunnels, according a criterion such as the 'feature set'. The following are the key characteristics of outer and inner tunnels and their relationship according to an aspect of this invention.

Outer tunnel always originates at a SSE-GW and terminates at another SSE-GW.

Inner tunnel originates at an anchor and terminates at another anchor.

Inner tunnel is mapped to at least one outer tunnel.

Inner and outer tunnels are both unidirectional.

An inner tunnel is identified by a unique TEID.

An outer tunnel is identified by an ID, tag, key, port, TEID and/or IP address depending on the type of outer tunnel used.

An outer tunnel carries a plurality of inner GTP-U tunnels corresponding to a plurality of UEs of the same service class and belonging to the same feature set.

Each outer tunnel's route and characteristics are configured on the switches of the core SDN by the Controller.

Each outer tunnel and its characteristics are configured on the SSE-GW by the Controller.

User equipment's PDU session is assigned a pair of Tunnel ID (TEID) to be used between two anchors, one for each traffic direction. The TEID is essentially the ID of the (GTP-U) tunnel. When another tunnel is used, say between another pair of anchors for the same user another pair of TEIDs is assigned to this tunnel. Each anchor can map an incoming tunnel to an outgoing tunnel by inspecting the TEID. Typically, Session Management Function, SMF, assigns the so-called 'CN Tunnel Info' for the UE's PDU session. The CN Tunnel info comprises the IP address and TEID assigned to the tunnel between, for example, the gNodeB and UE's serving UPF. Additionally, the UE is assigned an IP address by the UPF, which appears within the GTP-U tunnel payload. The TEID and QoS of each UE are known by the gNodeB, to which user equipment connects.

According to an aspect of this invention, the Controller of core SDN has an interface to the gNodeB, SMF, PCF or OSS/BSS to gather all CN tunnel info and UE's IP address, QoS, and service policies (such as security or reliability) and priorities (such as extra high priority, preemption, etc.). The Controller then processes and sends this information to the SSE-GW using an API according to an aspect of this invention. When there is a data packet of the UE sent by the eNodeB towards the associated UPF in a GTP-U tunnel with that CN info, this tunnel is intercepted at the SSE-GW, wrapped into the proper type of outer tunnel and routed towards the SSE-GW located adjacent to the other end's anchor point by crossing at least one other SDN switch along the tunnel's path. The paired SSE-GW strips off the outer tunnel and forwards the GTP-U encapsulated packets towards the UPF. The outer tunnel's TEID or tag is assigned by the Controller. The instruction to form a new outer tunnel or break an existing outer tunnel comes from the Controller.

Although this embodiment is described for the 5G network, the SSE-GW can also be implemented in an LTE network exactly the same way between the eNodeB and the S-GW, wherein the controller interfaces with MME or eNodeB to gather control messages that contain the TED values and UE's QCI. The controller may gather user priority information from Policy and Charging Rules Function (PCRF). Although, SSE-GW's interfaces may change based on the network type (LTE or 5G), its functions are identical.

This invention can be used at all interfaces of the 2G, 3G, 4G, or 5G networks wherein GTP-U tunneling is used.

The Controller performs (a) route determination for the core SDN switches and (b) SSE-GW tunnel mapping configuration and instructions, (c) SSE-GW tunnel forwarding configuration and instructions, and (d) managing SSE-GW tunnel establishment/dissolution.

SSE-GW is essentially a specialized apparatus that performs inner tunnel-to/from-outer tunnel mapping function according tunnel classification instructions from the Controller. It optionally performs pre-processing on each GTP-U tunnel by performing header compression before encapsulating inner tunnels into outer tunnels, by removing unnecessary portions the inner tunnel header for routing, and by post-processing on each GTP-U tunnel by header insertion at the other end after unwrapping of the tunnel. Each SSE-GW is attached to a plurality of SDN switches, which perform packet forwarding (of outer tunnels) towards the destination 5G network function. The SSE-GW performs the following tasks:

Wrapping a received user's GTP-U tunnel to an outer tunnel Unwrapping an outer tunnel, and releasing the GTP-U user's tunnel Switching over a received GTP-U tunnel, from one outer tunnel to another outer tunnel Receiving inner tunnel packets from a 5G anchor (network service function)

Forwarding outer tunnel packets towards an SDN switch

Receiving outer tunnel packets from an SDN switch

Forwarding inner tunnel packets to a 5G anchor (network service function)

Establishing/Dissolving more than one outer tunnel with different protocols or properties Firewall to provide a full VPN service Performing removal and insertion of the inner tunnel headers.

Deep Packet Inspection

The aforementioned tasks are transformed into 'flow rules/tables', within the controller, which form the set of instructions prepared for each individual network switch precisely defining where and how to forward the packets of each packet flow passing through that switch. The 'where' part defines to which outgoing port of switch the packet must be sent, whereas the 'how' part defines what changes must be performed to each packet matching a criteria defined in the flow rules (changes in the header fields, for example). The controller sends the flow rules to each network switch and updates them as the network topology or services change.

When the outer tunnel header is inserted into IP packets, the SSE-GW may decide to retain the entire inner tunnel IP, UDP, and GTP-U headers. In another embodiment, only GTP-U header, which includes TEID, is retained from the inner tunnel by removing the remaining fields of the inner tunnel such as the IP and UDP headers without compromising the integrity of the packets. Doing so, the header overhead is reduced.

The Controller of this invention has two new functions: (a) SSE-GW controller, and (b) SSE-GW data collector. In addition, it has several new databases: (c) feature set DB, (d) outer tunnel configurations DB, and (e) inner tunnel to outer tunnel mappings DB. SSE-GW controls sub-function manages only SSE-GWs in the core SDN using and API and/or a protocol such as OpenFlow to send instructions regarding tunnels. SSE-GW data manager sub-function communicates with external systems of the 5G core network to gather most up to date GTP-U tunnel related information such as the tunnel TEID, quality of service, security, reliability and other possible service policy and charging requirements.

Embodiments of the present invention are an improvement over prior art systems and methods.

SUMMARY OF THE INVENTION

In one embodiment, the present invention provides a method implemented in a mobile core network comprising a software defined network (SDN) based switched network and a plurality of virtualized core network functions distributed across the SDN switched network, the method comprising: (a) mapping a group of GPRS Tunneling Protocol-U (GTP-U) tunnels into an outer tunnel, the group of GTP-U tunnels: (a) formed between any two functions of the mobile core network, (b) established to carry user equipment's (UE's) user data or control data, and (c) sharing the same feature set or properties; and (b) storing only packet forwarding information in the SDN switches for traversal of the outer tunnel across the SDN network, without needing to store packet forwarding information for each individual GTP-U tunnel in the group of GTP-U tunnels.

In another embodiment, the present invention provides a method implemented in a first gateway that is directly attached to a first network service function of a mobile core network, a second gateway attached to a second network service function, both the first gateway and the second gateway attached to an SDN network, the SDN network comprising a plurality of switches, the first gateway and the second gateway and SDN network controlled by a controller, wherein a plurality of GPRS Tunneling Protocol-U (GTP-U) tunnels originate from the first network service function and terminate at the second network service function, each GTP-U tunnel in the GTP-U tunnels identifiable by a Tunnel ID, each GTP-U tunnel in the GTP-U tunnels having a similar feature set, and each GTP-U tunnel in the GTP-U tunnels carrying different user equipment's (UE's) IP packets, and wherein the controller receiving at least the Tunnel ID and feature set of each GTP-U tunnel in the GTP-U tunnels from the mobile core network, the method comprising: (a) receiving an instruction from the controller to form a new tunnel that has a feature set identical to that of the plurality of GTP-U tunnels, the instruction including an identifier and a header of the new tunnel; (b) mapping each GTP-U tunnel received from the first network service function to the new tunnel by encapsulating it with the header of the new tunnel; and (c) routing IP packets in the new tunnel towards the second gateway via an interface associated with a next hop switch, the next hop switch having only instructions to route the new tunnel towards its next hop.

In yet another embodiment, the present invention provides a method implemented in a first gateway that is directly attached to a first network service function of a mobile core network, a second gateway attached to a second network service function which has a function different than that of the first network service function, both the first gateway and second gateway attached to a Software Defined Network (SDN) comprising a plurality of switches, the first gateway, second gateway and the SDN network being controlled by a controller, wherein a first group of GPRS Tunneling Protocol-U (GTP-U) tunnels originating from the first network service function and terminating at the second network service function, each tunnel in the GTP-U tunnels: having a Tunnel ID, having a similar feature set, and carrying different user equipment's (UE's) IP packets, wherein a second group of GTP-U tunnels originating from the first network service function and terminate at the second network service function, each tunnel in the second group of GTP-U tunnels: having another Tunnel ID, having a different feature set from that of the first group, and carrying different user equipment's (UE's) IP packets than that of the first group; the controller receiving at least the Tunnel ID, the another Tunnel ID, the similar feature set, and the different feature set from the mobile core network, and the method comprising the steps of: (a) receiving an instruction from the controller to form a first new tunnel and a second new tunnel, the first new tunnel having a first feature set identical to that of the feature set associated with the first group of GTP-U tunnels, the instruction including a first header of the first new tunnel, and the second new tunnel having a second feature set identical to that of the different feature set associated with the second group of GTP-U tunnels, said instruction including the second header of the second tunnel; (b) mapping GTP-U tunnels received from the first network service function of the first group to the first new tunnel by encapsulating it with the first header of the first new tunnel; (c) mapping GTP-U tunnels received from the second network function of the second group to the second new tunnel by encapsulating it with the second header of the second new tunnel; and (d) routing IP packets in the first and second new tunnels towards the second gateway via an interface associated with a first hop switch and a second next hop switch, each of the first hop switch and the second hop switch having only instructions to route the first new tunnel and second new tunnel towards its next hop.

In another embodiment, the present invention provides a system implemented in a mobile core network, the gateway system attached directly to a plurality of at least one network function of mobile core network, and a plurality of software defined network (SDN) switches, and paired with another gateway system, wherein said gateway system constructs a new tunnel to wrap a group of GTP-U tunnels and the paired gateway system to unwrap the new tunnel into its constituent GTP-U tunnels, the system comprising: (a) a plurality of physical interfaces towards a plurality of network functions; (b) a plurality of physical interfaces towards SDN switches; (c) an interface to the SDN controller receiving instructions on processing new tunnels and GTP-U tunnels; (d) a preprocessor subsystem removing part of GPRS Tunneling Protocol-U (GTP-U), User Datagram Protocol (UDP) and IP headers from GTP-U tunnels and adding outer tunnel headers; (e) a postprocessor subsystem removing outer tunnel headers and inserting part of GTP-U, UDP and IP headers into GTP-U tunnels; (f) a forwarding engine forwarding packets towards a next hop SDN switch or network function; and (g) a database storing tunnel feature sets, tunnel mappings and header related information.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 6B shows the message flow for UE connection update according to the present invention.

DESCRIPTION OF THE PREFERRED EMBODIMENTS

Figure 1A:
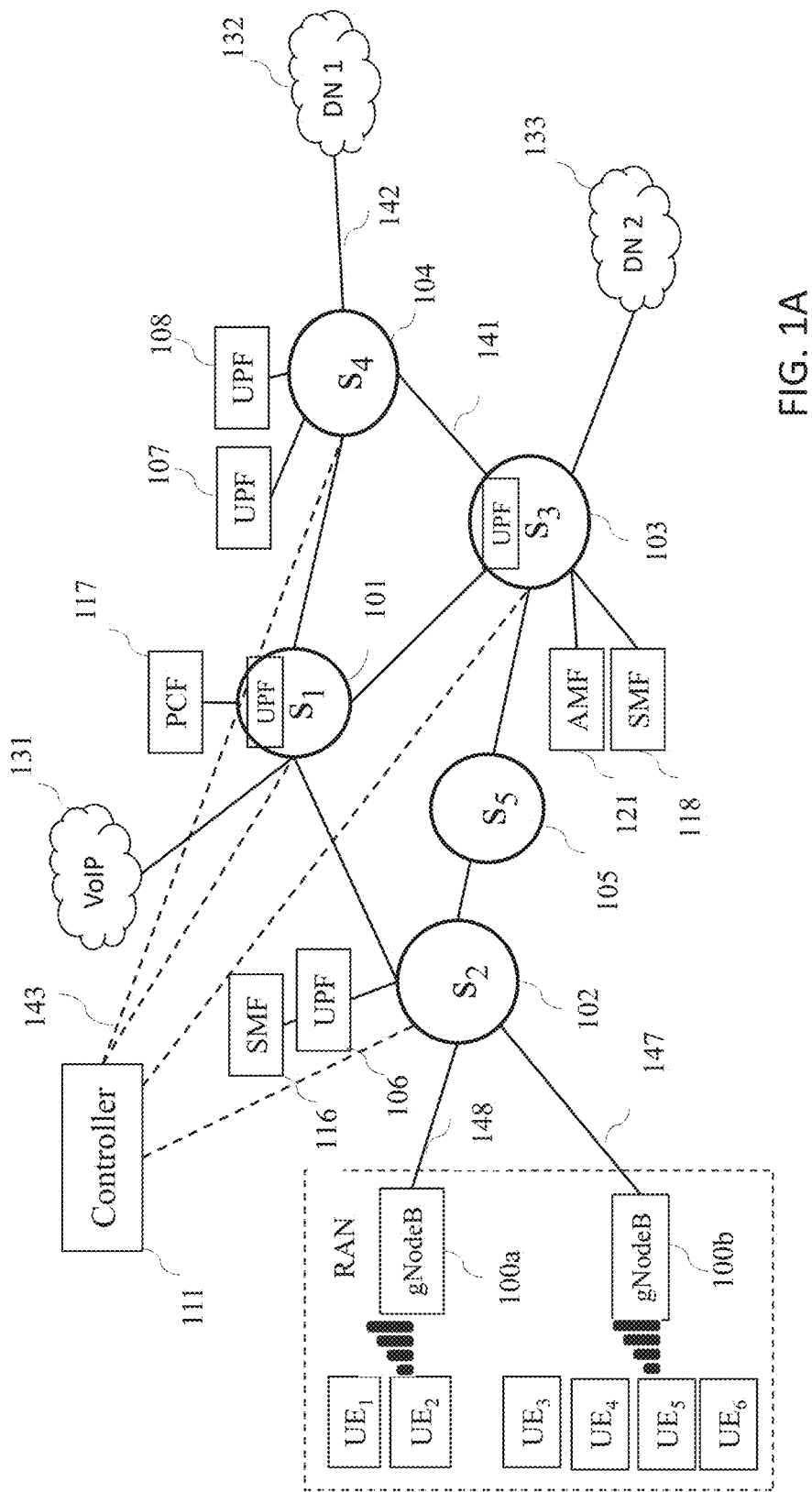
FIG. 1A illustrates a prior art 5G core network using an SDN.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a router, switch, gateway, hardware platform, controller etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a switch, router, controller, gateway or host is a piece of networking component, including hardware and software that communicatively interconnects with other equipment of the network (e.g., other network devices, and end systems). Switches provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video).

Any physical device in the network is generally identified by its type, ID/name, Medium Access Control (MAC) address, and Internet Protocol (IP) address. A virtual function runs on a physical platform that can be the switch or a server attached to the switch. There may be several instances of the same virtual function or different types of virtual functions on the same physical platform. The controller of the SDN can run on a single server or may be distributed on several servers. At any point in time, one controller may be the master while others are slaves. Alternatively, the plurality of controllers may be in a peer mode. The controller is attached to each switch in the network.

Note that while the illustrated examples in the specification discuss mainly 5G networks relying on SDN (as Internet Engineering Task Force [IETF] and Open Networking Forum [ONF] define), and NFV (as European Telecommunications Standards Institute (ETSI) define), embodiments of the invention may also be applicable in other kinds of network (mobile and non-mobile) that widely uses GTP-U tunnels and SDN networks.

FIG. 1A is a simple 5G backhaul network that (a) comprises User Equipment 1, 2 . . . 6, wherein UE 1 and 2 are attached to base station (gNodeB) 100a, and UE 3, 4, 5 and 6 attached to base station (gNodeB) 100b, forming a Radio Access Network (RAN), (b) SDN switches S1, S2, S3, S4 and S5 labeled as 101, 102, 103, 104 and 105, respectively, (c) SDN controller 111 controlling SDN switches using control channels 143 (shown as dotted lines), (d) various 5G network functions that are virtualized and distributed across the SDN network, and (e) external networks such as Data Networks (DN) 1 and 2, labeled as 132 and 133, respectively, and VoIP network labeled as 131. SDN switches S1 and S3 have onboard UPF functions. Other UPF functions are UPF 107 and 108, which are collocated with switch S4, and UPF 106 which is collocated with switch S2. SMF 116 and 118, PCF 117 and AMF 121 are also illustrated. Note that FIG. 1A does not show all network functions. Only a few exemplary functions are illustrated. GTP-U tunnels traverse the aforementioned SDN switches in the 5G core network along all defined interfaces (N1, N3, etc).

Figure 1B:
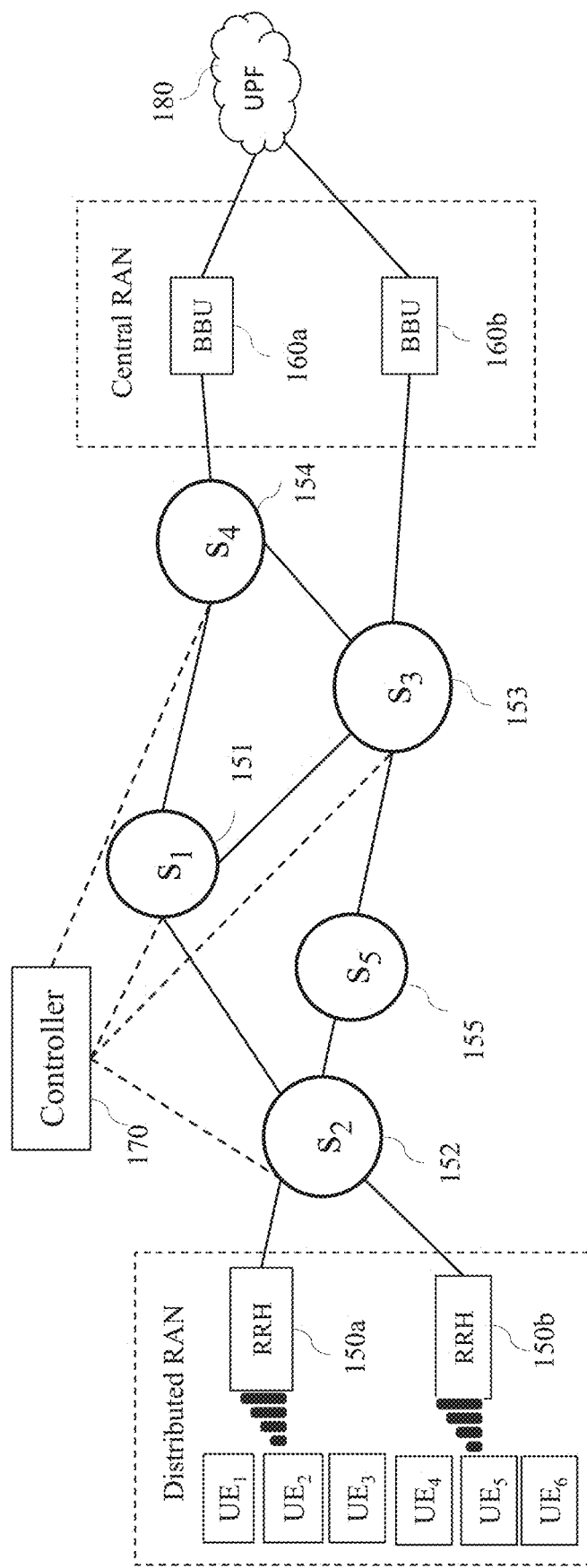
FIG. 1B illustrates a prior art 5G fronthaul network using an SDN.

FIG. 1B illustrates an exemplary 5G fronthaul network with (a) RRH 150*a* and 150*b* forming the distributed RAN to which UE 1, 2 ..., 6 attach, (b) BBU 160*a* and 160*b* that form the central RAN and control the remotely located RRH 150*a* and 150*b*, and (c) an SDN network formed by switches S1, S2, S3, S4 and S5, labeled as 151, 152, 153, 154 and 155, respectively, and controller 170. In 5G terminology, BBU and RRH units are defined as gNodeB-CU and gNodeB-DU, respectively, which are connected with F1 interface (ETSI's 3GPP TS 38.470). In F1 interface, user and control planes are separate functions and user plane carries the UE data over GTP-U tunnels. These GTP-U tunnels traverse the aforementioned SDN switches in the fronthaul network between RRH 150*a*, 150*b* and UPF 180.

Figure 2:
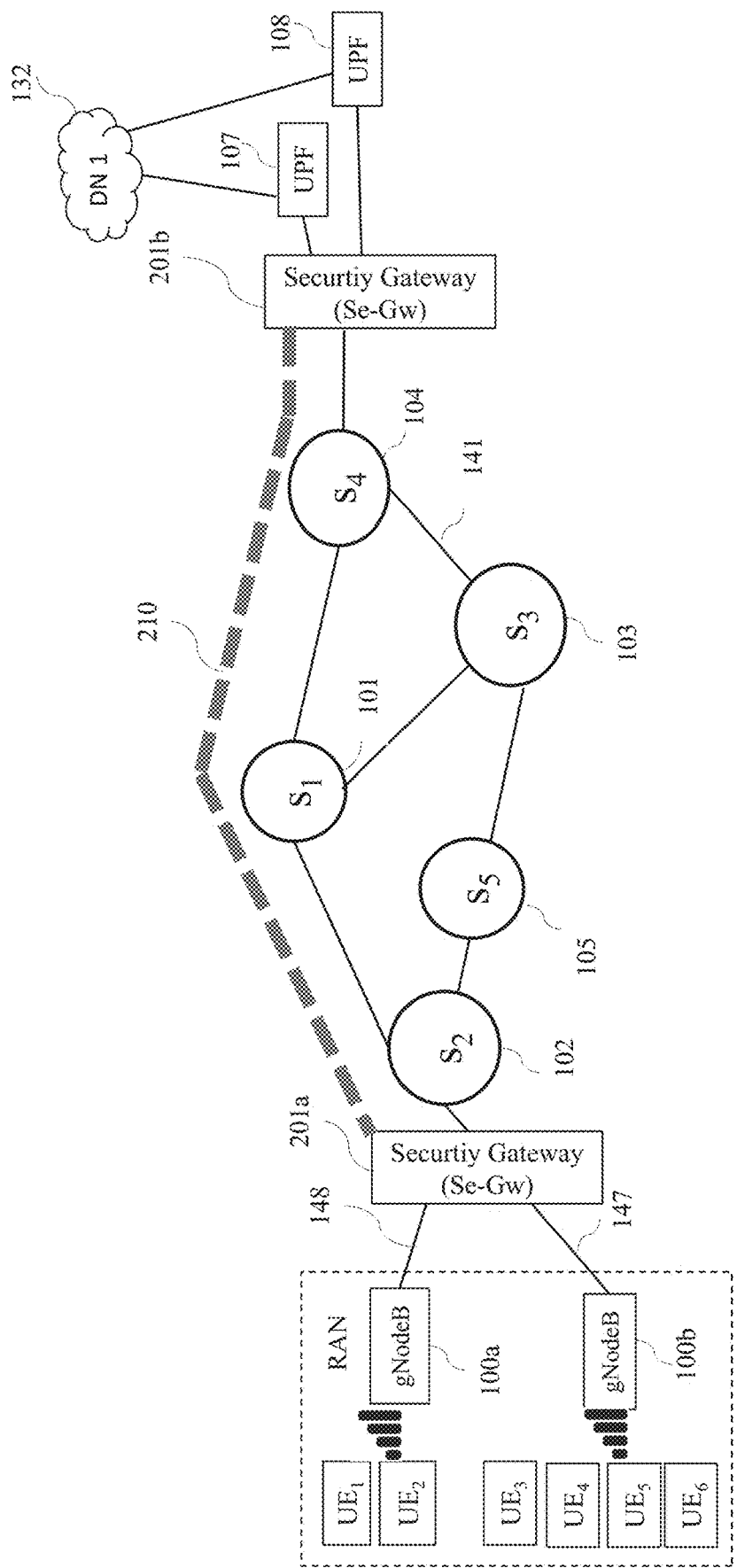
FIG. 2 illustrates a prior art backhaul network with security gateways.

FIG. 2 illustrates a secure backhaul network example with two security gateways (Se-Gw) 201*a* and 201*b*. When the backhaul or fronthaul communication does not traverse dedicated physical connections of the operator but instead shares facilities with other operators, user and control plane communication are secured by encrypted outer IP layer tunnel 210. The security gateways 201*a* and 201*b* establish IP layer secure tunnel 210 and encrypt all traffic between gNodeBs 100*a*/100*b* and UPFs 107/108. Hence, security gateways, which are well known in prior art, are entities at the border of IP security and act as VPN routers.

Figure 3A:
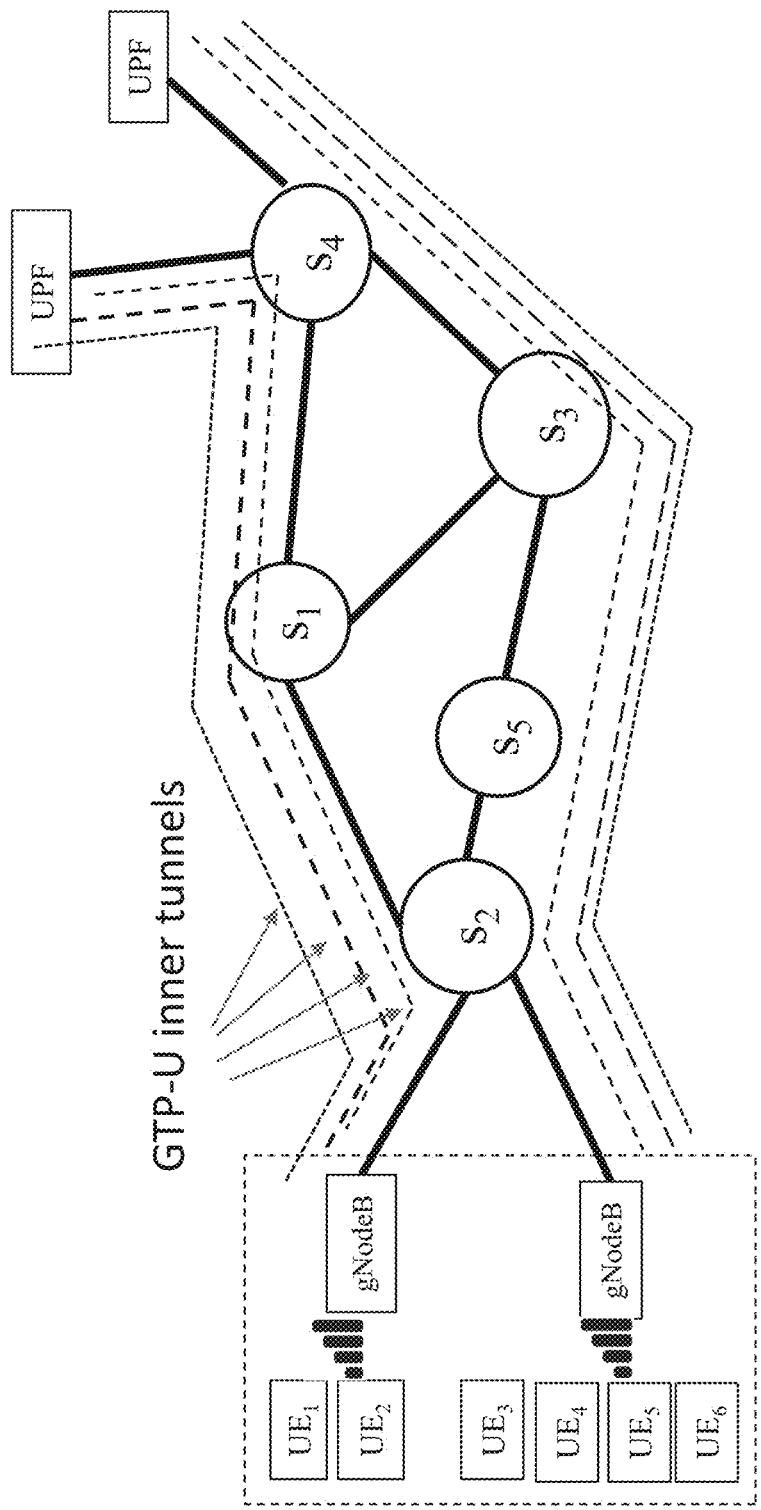
FIG. 3A illustrates prior art use of inner GTP-U tunnels.
Figure 3B:
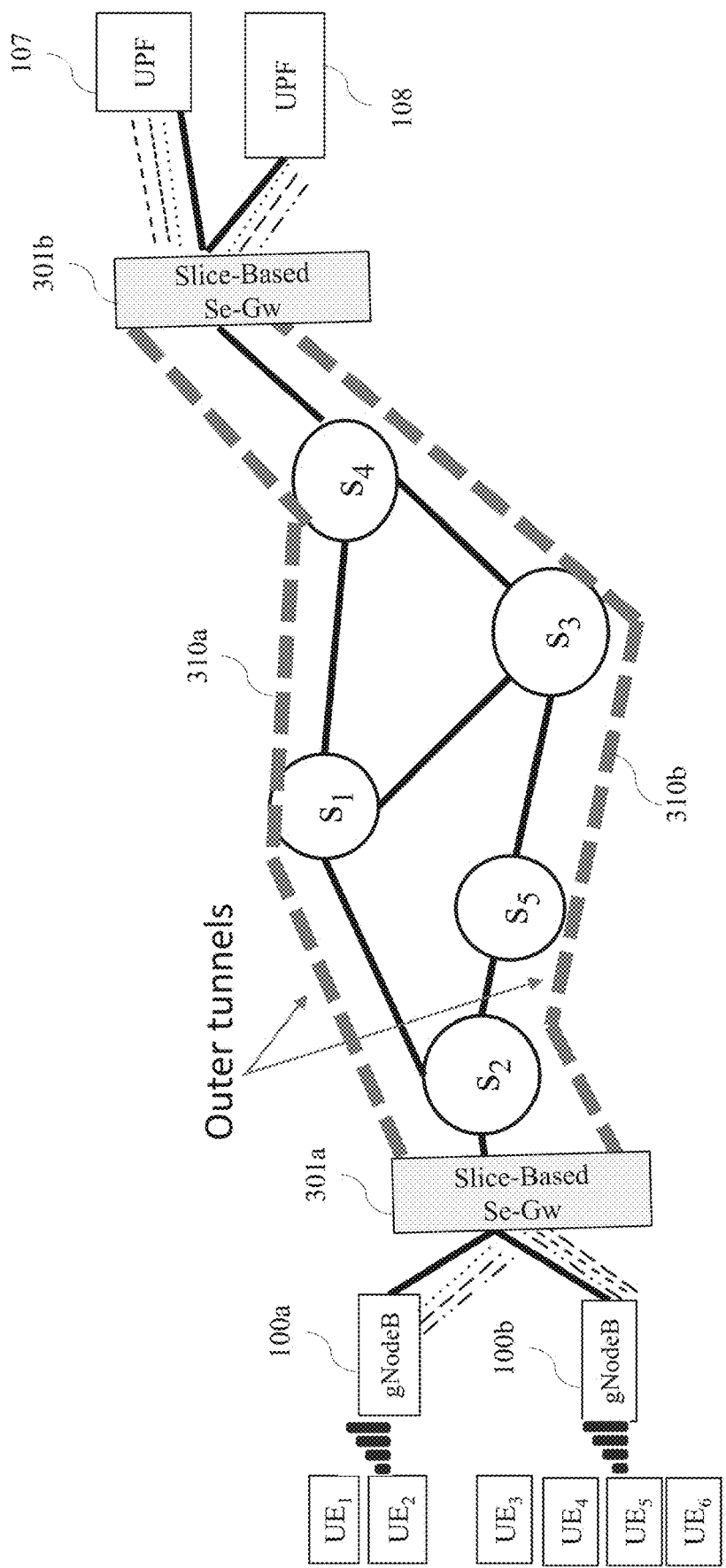
FIG. 3B depicts use of outer tunnels according to the present invention.

FIGS. 3A and 3B depict the inner and outer tunnels corresponding to the network of FIGS. 1A, 1B and 2, respectively. FIG. 3A shows six inner GTP-U tunnels each tunnel corresponding to a UE. In this network, traffic prioritization of different UEs or traffic types is handled by Tunnel IDs (TEID)s located in GTP-U headers. FIG. 3B shows two outer tunnels, 310*a* and 310*b* between slice-based security gateways (SSe-GW) 301*a* and 301*b*, according to an aspect of this invention. Each inner tunnel, shown between gNodeB and SSe-GW, is wrapped onto one of the two outer tunnels. At the other end, the outer tunnel is unwrapped, and the exposed inner tunnel is sent to the appropriate UPF. A pair of Slice-based Security Gateway, (SSe-GW), are deployed in front of gNodeB 100*a* and 100*b*, and in front of UPF 107 and 108. Outer tunnels are formed only between SSe-GW 301*a* and 301*b*, and all inner GTP-U tunnels, formed between gNodeB(s) and UPF(s), are mapped into one of these outer tunnels. One SSe-GW can be deployed for a group of tunnel originating (anchor) network function of the same or different types. SSe-GW 301*a* supports gNodeB 100*a* and 100*b*, while SSe-GW 301*b* supports both UPF 107 and 108. In another embodiment, a SSe-GW can be deployed per gNodeB and per UPF.

Figure 4A:
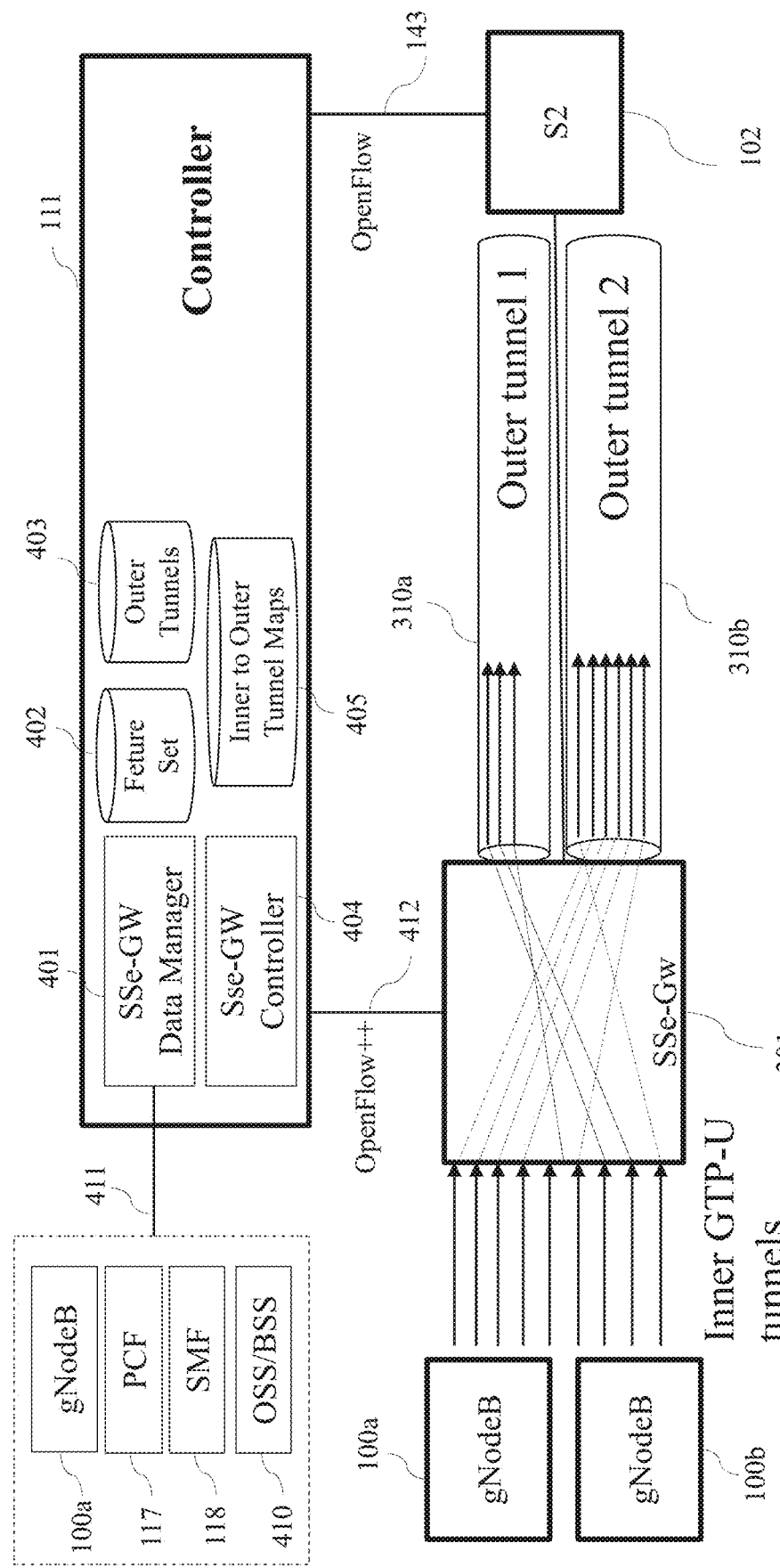
FIG. 4A illustrates the controller block diagram according to the present invention.
Figure 4B:
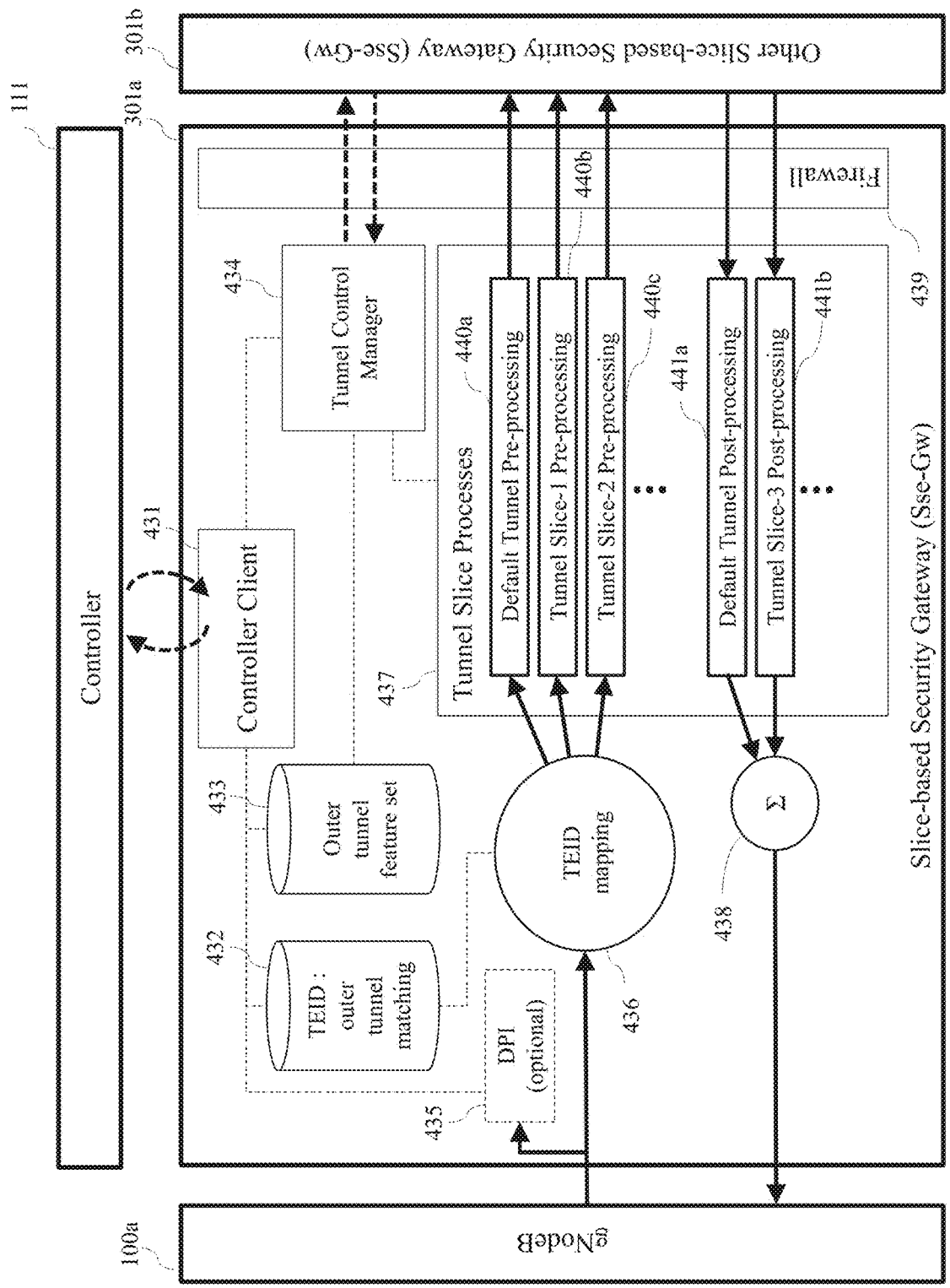
FIG. 4B illustrates the SSE-GW block diagram according to the present invention.

FIGS. 4A and 4B illustrate the two components of system of invention, namely Controller and SSe-GW, respectively. In FIG. 4A, Controller 111 has all SDN controller functions of prior art (not illustrated for simplicity), and two additional functions to manage outer tunnels (a) SSe-GW Data Manager 401, (b) SSe-GW Controller 404, (c) Database 405 of inner to outer tunnel mapping information, (d) Database 402 of feature sets of outer tunnels, and (e) Database 403 of outer tunnel information (such as tunnel end points, tunnel ID, such as key, tag or TEID etc., header info), tunnel status (active, operational, failed, etc.) and its mapping to feature set. These are some of the exemplary information. Additional tunnel related information may also be stored in the databases.

SSe-GW Data Manager 401 collects identifying information on inner tunnels in real-time from various network components such as gNodeB 100*a*, PCF 117, SMF 118 and OS SBSS 410. It may optionally receive some packets of the payload of the inner tunnels (using OpenFlow Packet_In message that captures a packet and sends it to the controller) to apply Deep Packet Inspection (DPI) to determine the application type carried by the inner tunnel. This feature may be needed if outer tunnel feature set includes Application Type as a feature. The feature set can also include policies which may include change of backhaul service depending on the time of the day or type of the user/service, or the utilization percentage of third party backhaul network. Application Type from a UE may also be manually configured or obtained via other means such as an external system (not illustrated in the figure), or via a DPI resident in SSe-GW.

SSe-GW Controller 404 controls a plurality of SSe-GW 301*a* using an API on interface 412, which may be an extension of OpenFlow (labeled as OpenFlow++) or another type of API such as RESTFUL API, or P4. This interface is used for the controller to send flow instructions to perform key operations such as (a) Creation of an outer tunnel, (b) Inner tunnel's header removal/extraction, integrity checking, and encryption, (c) Wrapping an inner tunnel to an outer tunnel, (d) Unwrapping an outer tunnel into inner tunnels, (e) Unwrapped inner tunnel header addition, integrity checking, and decryption, (f) Forwarding tunnel (outer and inner) packets to different interfaces (just as in standard SDN switches).

FIG. 4A illustrates SSe-GW 301*a* and SDN switch S2, both controlled by Controller 111, using interfaces 412 and 143, respectively. Interface 143 is OpenFlow.

FIG. 4B illustrates inner functions, processes, and databases in SSe-GW 301*a*, the system of invention. The directives from Controller 111 is interpreted by Controller Client 431. These directives may contain establishment, modification, removal of tunnel slices or changes in TEID mapping. When Controller 111 sends directives for TEID mapping modification, Controller Client 431 updates the TEID: outer tunnel matching database 432, which contains TEID to tunnel slice (outer tunnel) mapping. Optionally, TEID mapping can be modified by a DPI function 435 depending on pre-configured service priorities.

When a packet arrives from gNodeB 100*a* in a GTP-U tunnel, it is forwarded to TEID mapping function 436. The packet is routed to one of the tunnel preprocesses 440*a*, 440*b*, or 440*c* depending on its outer tunnel defined in TEID database 432. If TEID of incoming message does not exist in 432, it is routed to default tunnel pre-processing, 440*a*. Every tunnel pre-processing has a corresponding post-processing in one or multiple SSe-GWs 301*b*. The incoming tunneled packets from 301*b* traverses the corresponding tunnel post-processes 441*a* or 441*b*, which are serialized in 438, and are forwarded to destination gNodeBs 100*a* after removal of outer tunnel headers. In most of the cases, SSe-Gw contains a firewall 439 for ports to other SSe-GWs 301*b* for potentially untrusted outer network.

When Controller 111 sends a directive for changes in outer tunnel slices, a new configuration is maintained in outer tunnel feature set 433 and the corresponding action is managed by Tunnel Control Manager 434. As the types of the outer tunnels can be different, the tunnel establishment, modification, removal procedures may vary. Depending on the outer tunnel configuration, opposing Tunnel Control Managers 434 of 301a and 301b may require additional in-band control communications depending on the protocol. For example, if SSe-Gws 301a and 301b have to establish a new IPSec outer tunnel, they first initiate an IKE/IKE2 security handshake for key exchange between their Tunnel Control Managers 434.

Figure 4C:
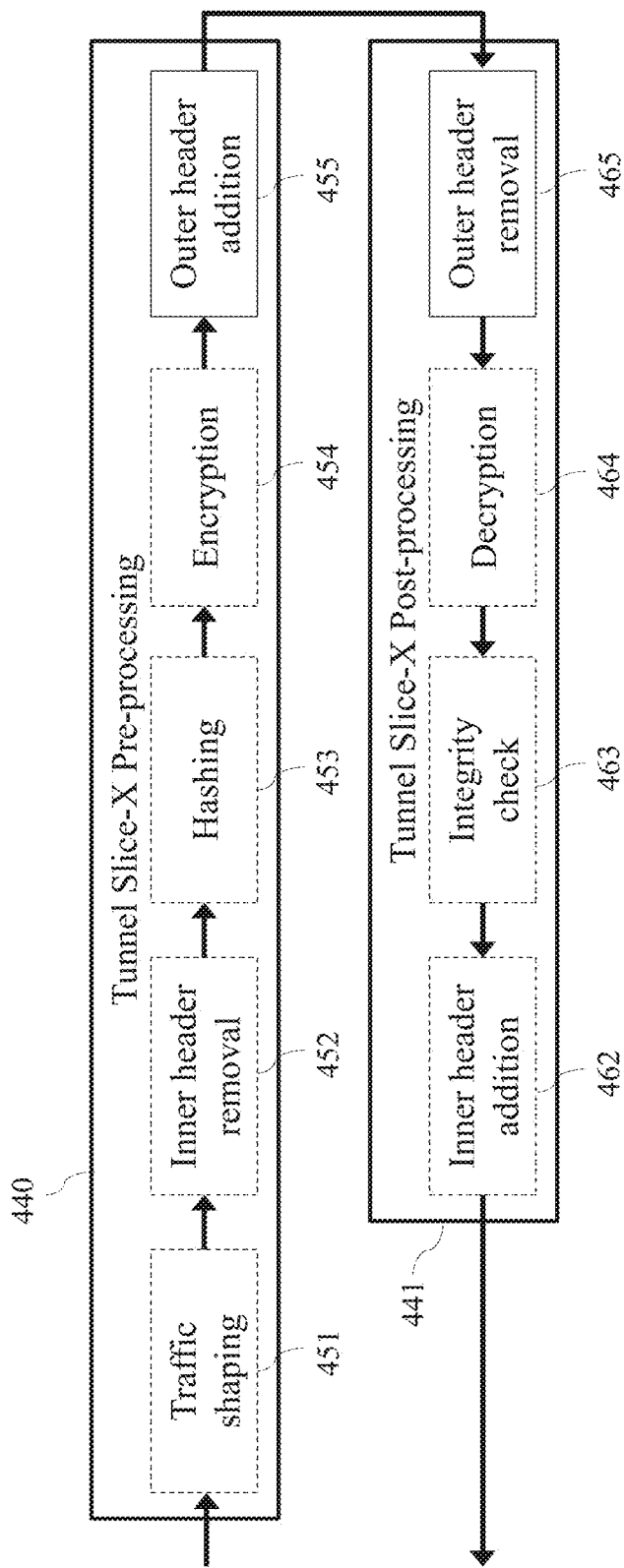
FIG. 4C depicts the tunnel slice process blocks according to the present invention.

FIG. 4C illustrates potential inner functions of Tunnel Slice Pre-processing 440 and Tunnel Slice Post-Processing 441. Note that each SSe-GW performs pre-processing for incoming GTP-U tunnels in one direction (mainly to map into outer tunnels), and post-processing for incoming outer tunnels (mainly to retrieve the inner GTP-U tunnels) in the opposite direction. All the blocks with dashed outline are optional for slice configuration, while Outer header addition 455 and Outer header removal 465 blocks are compulsory. Even though the dashed optional blocks are illustrated as ordered functions, they can be parallel, conditional, or loop-based processes which may contain any possible task defined by controller. Depending on slice configuration, Controller 111 may configure load balancing by limiting the maximum bandwidth of the slice by Traffic Shaping 451 block. When the IP and UDP headers of the specified GTP-U tunnels are the same, these headers can be removed in 452 before forming the outer tunnel packets and added back again in 462 before retrieving the inner tunnel packets to avoid transmission of redundant headers.

Moreover, the slices may contain Hashing 453 and Integrity Check 463 for detection of attacks or transmission errors, and encryption 454 and decryption 464 functions to secure the information in encrypted tunnels.

Figure 5:
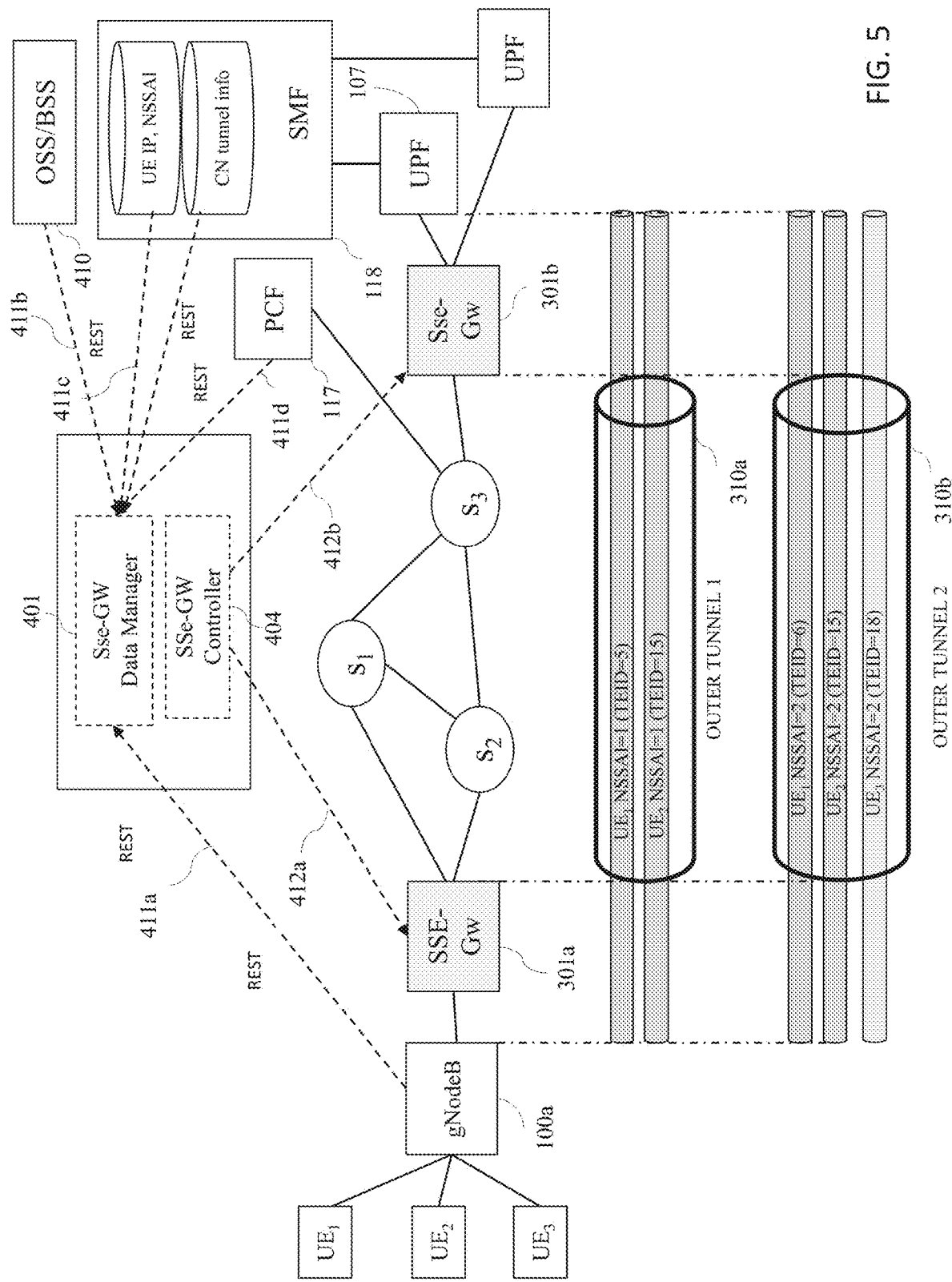
FIG. 5 illustrates the complete network with the systems of the present invention.

FIG. 5 illustrates a general tunnel slicing scenario for different service slices of 5G. In this scenario, different service types are identified with NSSAI, each user has different bearers (so different corresponding TEIDs) for each service. In this example, several options for 411 interface is illustrated. Hence, TED information for each UE and service can be gathered from 411a, 411b, 411c, or 411d, depending on the network. Outer tunnel 310a transmits only NSSAI=1 traffic, while Outer tunnel 310b only transmits NSSAI=2 traffic. Therefore, this scenario provides operator capability of differentiating properties like backhaul delay, security level for different NSSAIs.

Figure 6A:
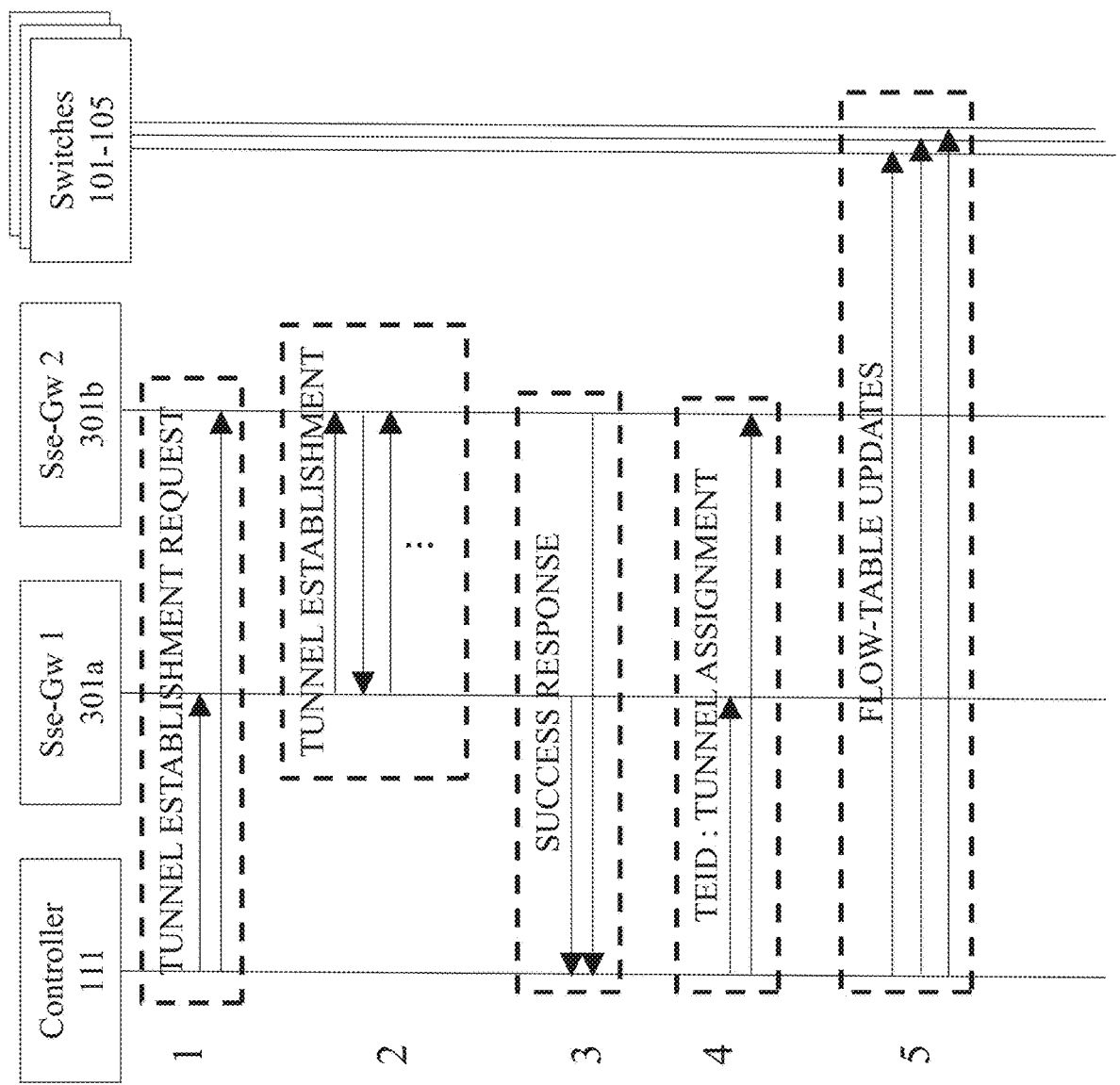
FIG. 6A shows the message flow for tunnel establishment according to the present invention.

FIGS. 6A and 6B illustrate two message flow examples. In FIG. 6A, Controller 111 sends tunnel establishment request to both SSe-GWs using the API of interface 143. Depending on the type of the tunnel protocol, SSe-GWs 301a and 301b may exchange control messages for key exchange and protocol agreement purposes. When Tunnel Control Manager 434 establishes the tunnel, SSe-GWs 301a and 301b return success response to the Controller 111. As the controller gets the success message from both SSe-GWs, it sends TEID routing information for new outer tunnel and updates all flow-tables of the SDN switches on the route of the outer tunnel depending on the delay and bandwidth requirements of the slice. FIG. 6B summarizes an example procedure for the UE attachment. When UE attaches, gNodeB 100a notifies Controller 111 with UE-info and TEIDs of newly established GTP-U tunnels. UE-info may include IMSI, NSSAI or any identity that differentiates service type. Depending on UE-info, Controller 111 may choose to establish a new outer tunnel for newly attached UE. Otherwise, Controller 111 sends matching info TEIDs of new UE to an existing outer tunnel slice.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to controllers or processors that may execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of an apparatus and method for controller and slice-based security gateway for 5G based communications. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method implemented in a mobile core network comprising a software defined network (SDN) based switched network and a plurality of virtualized core network functions distributed across the SDN switched network, the method comprising:
   a. mapping a group of GPRS Tunneling Protocol-U (GTP-U) tunnels into an outer tunnel, the group of GTP-U tunnels: (a) formed between any two virtualized core network functions of the mobile core network, (b) established to carry user equipment's (UE's) user data or control data, and (c) sharing the same feature set or properties; and
   b. storing only packet forwarding information in the SDN switches for traversal of the outer tunnel across the SDN network, without needing to store packet forwarding information for each individual GTP-U tunnel in the group of GTP-U tunnels within the outer tunnel.

2. A method implemented in a first gateway that is directly attached to a first network service function of a mobile core network, a second gateway attached to a second network service function, both the first gateway and the second gateway attached to an SDN network, the SDN network comprising a plurality of switches, the first gateway and the second gateway and SDN network controlled by a controller,
   wherein a plurality of GPRS Tunneling Protocol-U (GTP-U) tunnels originate from the first network service function and terminate at the second network service function, each GTP-U tunnel in the GTP-U tunnels identifiable by a Tunnel ID, each GTP-U tunnel in the GTP-U tunnels having a similar feature set, and each GTP-U tunnel in the GTP-U tunnels carrying different user equipment's (UE's) IP packets, and
   wherein the controller receiving at least the Tunnel ID and feature set of each GTP-U tunnel in the GTP-U tunnels from the mobile core network,
   the method comprising:
   a. receiving an instruction from the controller to form a new outer tunnel that has a feature set identical to that of the plurality of GTP-U tunnels, the instruction including an identifier and a header of the new tunnel;
   b. mapping each GTP-U tunnel received from the first network service function to the new outer tunnel by encapsulating it with the header of the new outer tunnel; and
   c. routing IP packets in the new outer tunnel towards the second gateway via an interface associated with a next hop switch, the next hop switch having only instructions to route the new outer tunnel towards its next hop.

3. The method of claim 2, wherein, prior to the encapsulating step, the method further comprises the step of removing parts of the GTP-U tunnel header, UDP and IP header before encapsulating with the header of the new tunnel.

4. The method of claim 2, wherein the new outer tunnel is any of the following: virtual LAN (VLAN) tunnel, a Multiprotocol Label Switching (MPLS) tunnel, GPRS Tunneling Protocol (GTP) tunnel, Generic Routing Encapsulation (GRE) tunnel, and IPSec tunnel.

5. The method of claim 2, wherein the similar feature set comprises any of, or a combination of, the following information: QoS, bandwidth, latency, availability, application type, security method, and payment method.

6. The method of claim 2, wherein the new outer tunnel is an encrypted tunnel and the encapsulated GTP-U tunnels are encrypted.

7. The method of claim 2, wherein the controller sends instructions to the first gateway using an Application Program Interface (API).

8. The method of claim 2, wherein the first gateway and second gateway exchange a control protocol to manage the new outer tunnel using encryption keys.

9. The method of claim 2, wherein the controller obtains Tunnel ID (TED) and feature set for each GTP-U tunnel from any of, or a combination of, the following: eNodeB, Session Management Function (SMF), Access and Mobility Management Function (AMF), Policy Control Function (PCF), User Plane Function (UPF), Operation Support Systems (OSS), Business Support System (BSS), and a manual input.

10. The method of claim 2, wherein the first network service function or second network service function is any of the following: eNodeB, Session Management Function (SMF), Access and Mobility Management Function (AMF), User Plane Function (UPF), and Policy Control Function (PCF).

11. The method of claim 2, wherein the second gateway implements a reciprocal method to that of the first gateway, the reciprocal method comprising steps of:
 a. the second gateway receiving another instruction from the controller to terminate the new outer tunnel originated at the first gateway, the another instruction including an identifier and header of the new outer tunnel,
 b. the second gateway unwrapping each GTP-U tunnel received inside of new outer tunnel from first network function by removing the header of said new tunnel,
 c. the second gateway routing each unwrapped GTP-U tunnel towards the second network function.

12. The method of claim 11, wherein the method further comprises, in step (a), receiving from the controller the GTP-U header, if such header was removed by said first gateway during the phase of encapsulating to new outer tunnel.

13. A method implemented in a first gateway that is directly attached to a first network service function of a mobile core network, a second gateway attached to a second network service function which has a function different than that of the first network service function, both the first gateway and second gateway attached to a Software Defined Network (SDN) comprising a plurality of switches, the first gateway, second gateway and the SDN network being controlled by a controller,
 wherein a first group of GPRS Tunneling Protocol-U (GTP-U) tunnels originating from the first network service function and terminating at the second network service function, each tunnel in the GTP-U tunnels: having a Tunnel ID, having a similar feature set, and carrying different user equipment's (UE's) IP packets,
 wherein a second group of GTP-U tunnels originating from the first network service function and terminate at the second network service function, each tunnel in the second group of GTP-U tunnels: having another Tunnel ID, having a different feature set from that of the first group, and carrying different user equipment's (UE's) IP packets than that of the first group; the controller receiving at least the Tunnel ID, the another Tunnel ID, the similar feature set, and the different feature set from the mobile core network, and
 the method comprising the steps of:
 a. receiving an instruction from the controller to form a first new outer tunnel and a second new outer tunnel, the first new outer tunnel having a first feature set identical to that of the feature set associated with the first group of GTP-U tunnels, the instruction including a first header of the first new outer tunnel, and the second new outer tunnel having a second feature set identical to that of the different feature set associated with the second group of GTP-U tunnels, said instruction including the second header of the second tunnel;
 b. mapping GTP-U tunnels received from the first network service function of the first group to the first new outer tunnel by encapsulating it with the first header of the first new tunnel;
 c. mapping GTP-U tunnels received from the second network function of the second group to the second new outer tunnel by encapsulating it with the second header of the second new outer tunnel; and
 d. routing IP packets in the first and second new outer tunnels towards the second gateway via an interface associated with a first hop switch and a second next hop switch, each of the first hop switch and the second hop switch having only one instruction to route the first new tunnel and second new tunnel towards its next hop.

14. The method of claim 13, wherein, prior to each of the encapsulating steps in (b) and (c), the method further comprises the step of removing parts of the GTP-U tunnel header, UDP and IP header.

15. The method of claim 13, wherein the first or second new outer tunnel is any of the following: virtual LAN (VLAN) tunnel, a Multiprotocol Label Switching (MPLS) tunnel, GPRS Tunneling Protocol (GTP) tunnel, Generic Routing Encapsulation (GRE) tunnel, and IPSec tunnel.

16. The method of claim 13, wherein identical feature sets comprise any of, or a combination of, the following information: QoS, bandwidth, latency, availability, application type, security method, and payment method.

17. The method of claim 13, wherein the controller sends instructions to the first gateway using an Application Program Interface (API), the API comprising any of the following: as OpenFlow or RESTFUL API.

18. The method of claim 13, wherein the controller obtains Tunnel ID (TEID) and feature set for each GTP-U tunnel from any of, or a combination of, the following: eNodeB, Session Management Function (SMF), Access and Mobility Management Function (AMF), Policy Control Function (PCF), User Plane Function (UPF), Operation Support Systems (OSS), Business Support System (BSS), and a manual input.

19. The method of claim 13, wherein the first network service function or second network service function is any of the following: eNodeB, Session Management Function (SMF), Access and Mobility Management Function (AMF), User Plane Function (UPF), and Policy Control Function (PCF).

20. A system implemented in a mobile core network, the gateway system attached directly to a plurality of at least one network function of mobile core network, and a plurality of software defined network (SDN) switches, and paired with another gateway system, wherein said gateway system constructs a new tunnel to wrap a group of GTP-U tunnels and the paired gateway system to unwrap the new outer tunnel into its constituent GTP-U tunnels, the system comprising:
  a. a plurality of physical interfaces towards a plurality of network functions;
  b. a plurality of physical interfaces towards SDN switches;
  c. an interface to the SDN controller receiving instructions on processing new tunnels and GTP-U tunnels;
  d. a pre-processor subsystem removing part of GPRS Tunneling Protocol-U (GTP-U), User Datagram Protocol (UDP) and IP headers from GTP-U tunnels and adding outer tunnel headers;
  e. a postprocessor subsystem removing outer tunnel headers and inserting part of GTP-U, UDP and IP headers into GTP-U tunnels;
  f. a forwarding engine forwarding packets towards a next hop SDN switch or network function; and
  g. a database storing tunnel feature sets, tunnel mappings and header related information.

21. The system of claim 20, wherein the system further comprises an interface to SDN controller, which: (1) interfaces to any of, or a combination of, the following: eNodeB, mobile core network functions, Operation Support Systems (OSS) and/or Business Support System (BSS) to collect GTP-U tunnel related information including Tunnel IDs and feature sets, (2) has a first function to determine new tunnel related information, and (3) has a second function to send the instructions in (c).

* * * * *

UNITED STATES PATENT AND TRADEMARK OFFICE
CERTIFICATE OF CORRECTION

Page 1 of 1

PATENT NO. : 10,798,638 B2
APPLICATION NO. : 16/278027
DATED : October 6, 2020
INVENTOR(S) : Can Altay, Beytullah Yigit and Seyhan Civanlar It is certified that error appears in the above-identified patent and that said Letters Patent is hereby corrected as shown below:

In the Specification

Column 6, Line 13, delete "TED" and insert therefore --TEID--.
Column 13, Line 39, delete "TED" and insert therefore --TEID--.

In the Claims

Claim 9:
Column 17, Line 26, delete "TED" and insert therefore --TEID--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*